United States Patent
Lee

(10) Patent No.: US 9,971,902 B2
(45) Date of Patent: May 15, 2018

(54) TERMINAL DEVICE, METHOD FOR PROTECTING TERMINAL DEVICE, AND TERMINAL MANAGEMENT SERVER

(71) Applicant: SK TELECOM CO., LTD., Seoul (KR)

(72) Inventor: Eungsuk Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 180 days.

(21) Appl. No.: 15/005,818

(22) Filed: Jan. 25, 2016

(65) Prior Publication Data
US 2016/0140358 A1 May 19, 2016

Related U.S. Application Data

(63) Continuation of application No. PCT/KR2014/008047, filed on Aug. 28, 2014.

(30) Foreign Application Priority Data

Aug. 29, 2013 (KR) .................. 10-2013-0103335
Aug. 30, 2013 (KR) .................. 10-2013-0104293

(51) Int. Cl.
*G06F 15/16* (2006.01)
*G06F 17/30* (2006.01)
(Continued)

(52) U.S. Cl.
CPC .......... *G06F 21/6218* (2013.01); *G06F 9/44* (2013.01); *G06F 9/4416* (2013.01); *G06F 11/30* (2013.01);
(Continued)

(58) Field of Classification Search
CPC .. G06F 21/6218; G06F 21/604; G06F 9/4416; G06F 21/60; G06F 11/30; H04L 63/083; H04W 12/08
(Continued)

(56) References Cited

U.S. PATENT DOCUMENTS 8,429,759 B2    4/2013   Adrangi
2005/0055397 A1  3/2005   Zhu et al.
(Continued)

FOREIGN PATENT DOCUMENTS

JP    2012199751 A    10/2012
KR    1020050025913 A    3/2005
(Continued)

OTHER PUBLICATIONS

International Search Report dated Dec. 30, 2014 for PCT/KR2014/008047.
(Continued)

*Primary Examiner* — Evans Desrosiers
(74) *Attorney, Agent, or Firm* — Hauptman Ham, LLP

(57) ABSTRACT

A terminal device includes: a memory unit to store a lock program for locking the terminal device; a condition checking unit to determine whether the terminal device is in a state of a preset condition for terminal protection when the lock program is executed; a lock control unit to allow the terminal device to be locked by the lock program when the terminal device is determined to be in a state of the preset condition for terminal protection; and a information deleting unit to delete an unlock key for use in unlocking the locked terminal device from the memory unit after the terminal device is locked.

9 Claims, 10 Drawing Sheets

(51) Int. Cl.
*H04L 29/06* (2006.01)
*G06F 21/62* (2013.01)
*G06F 9/44* (2018.01)
*G06F 11/30* (2006.01)
*G06F 21/60* (2013.01)
*H04W 12/08* (2009.01)

(52) U.S. Cl.
CPC .............. *G06F 15/16* (2013.01); *G06F 21/60* (2013.01); *G06F 21/604* (2013.01); *H04L 63/083* (2013.01); *H04L 63/0853* (2013.01); *H04W 12/08* (2013.01)

(58) Field of Classification Search
USPC .............................................................. 726/7
See application file for complete search history.

(56) References Cited

U.S. PATENT DOCUMENTS

| | | | |
|---|---|---|---|
| 2005/0170813 A1 | 8/2005 | Choi | |
| 2006/0190724 A1* | 8/2006 | Adams | G06F 21/6218 713/166 |
| 2008/0070590 A1 | 3/2008 | Miyajima et al. | |
| 2010/0325712 A1 | 12/2010 | Kakuta et al. | |
| 2011/0125875 A1 | 5/2011 | Matsui | |
| 2012/0258689 A1 | 10/2012 | Yang | |
| 2014/0026188 A1* | 1/2014 | Gubler | H04W 12/08 726/3 |
| 2014/0237190 A1 | 8/2014 | Park | |

FOREIGN PATENT DOCUMENTS

| | | |
|---|---|---|
| KR | 1020050079128 A | 8/2005 |
| KR | 1020060028275 A | 3/2006 |
| KR | 1020100024300 A | 3/2010 |
| KR | 1020100113385 A | 10/2010 |
| KR | 1020130024212 A | 3/2013 |

OTHER PUBLICATIONS

U.S. Office Action, dated Dec. 28, 2017 in connection with the corresponding U.S. Appl. No. 15/005,763.

* cited by examiner

TERMINAL DEVICE, METHOD FOR PROTECTING TERMINAL DEVICE, AND TERMINAL MANAGEMENT SERVER

CROSS-REFERENCE TO RELATED APPLICATIONS

The present application is a continuation of International Patent Application No. PCT/KR2014/008047, filed on Aug. 28, 2014, which claims priorities to and benefit of Korean Patent Application No. 10-2013-0103335, filed on Aug. 29, 2013 and Korean Patent Application No. 10-2013-0104293, filed on Aug. 30, 2013. The disclosures of the above-listed applications are hereby incorporated by reference herein in their entirety.

TECHNICAL FIELD

The present disclosure relates to a terminal device, a method for protecting the terminal device and a terminal management server.

BACKGROUND

The statements in this section merely provide background information related to the present disclosure and do not constitute prior art.

The inventor(s) has experienced that since users store important personal information (i.e., such as private information, financial information, security information and so on) on their terminal devices, for example, smart phones or tablet computers, the personal information is subject to secure from a private information exposure and be protected from identity theft.

The inventor(s) has noted that according to an exemplary method for protecting the personal information based on the OMA-DM (Open Mobile Alliance Device Management) standard, a terminal management application program is installed in a terminal device to perform a Lock & Wipe for protecting information stored in the terminal device. Subsequently, when a control message is remotely sent to the terminal device, the terminal management application program locks screen and functions of the terminal device in accordance with the control message, and deletes (wipes out) information stored in the terminal device, if required.

The inventor(s) has noted that there is a method for unlocking a terminal device locked by the aforementioned Lock & Wipe function by using a preset password. That is, the locked terminal device is unlocked if the password entered by a user requesting to unlock the locked terminal device matches with the preset password stored in advance.

However, the inventor(s) has experienced that when the terminal device is lost and some obtainer of the terminal device maliciously manipulates the terminal management application program of the terminal device so that the Lock & Wipe function is unable to be performed, the personal information therein is able to be leaked from the terminal device.

SUMMARY

In accordance with at least one embodiment of the above mentioned present disclosure, a terminal device includes: a memory unit, a condition checking unit, a lock control unit and an information deleting unit. The memory unit is configured to store a lock program for locking the terminal device. The condition checking unit is configured to determine whether the terminal device is in a state of a preset condition for terminal protection when the lock program is executed. The lock control unit is configured to allow the terminal device to be locked by the lock program when the terminal device is determined to be in a state of the preset condition for terminal protection. The information deleting unit is configured to delete an unlock key for use in unlocking the locked terminal device from the memory unit after the terminal device is locked.

In accordance with an embodiment of the above mentioned present disclosure, a method for protecting a terminal device comprising one or more processors and/or application-specific integrated circuits (ASICs), the method executed by the one or more processors and/or the ASICs, the method includes determining whether the terminal device is in a state of a preset condition for terminal protection. The method also includes locking the terminal device when the terminal device is determined to be in a state of the preset condition for terminal protection. The method also includes deleting an unlock key for use in unlocking the terminal device, from the terminal device after locking the terminal device.

In accordance with an embodiment of the above mentioned present disclosure, a terminal management server includes: a communication unit, an information storage unit, a terminal identification unit, a communication environment checking unit and a terminal management control unit. The communication unit is configured to support a plurality of communication channels for communication with a terminal device. The information storage unit is configured to store unique information of a terminal device to be protected to which locking is requested. The terminal identification unit is configured to determine whether the terminal device is an entity subject to be protected depending on a result of comparing identification information of the terminal device received through the communication unit with the unique information. The communication environment checking unit is configured to check a communication environment of the terminal device to be protected. The terminal management control unit is configured to send a terminal lock command and an unlock key deleting command to the terminal device to be protected through a communication channel determined based on the current communication environment status among the plurality of communication channels.

DETAILED DESCRIPTION OF THE EMBODIMENTS

Figure 1:
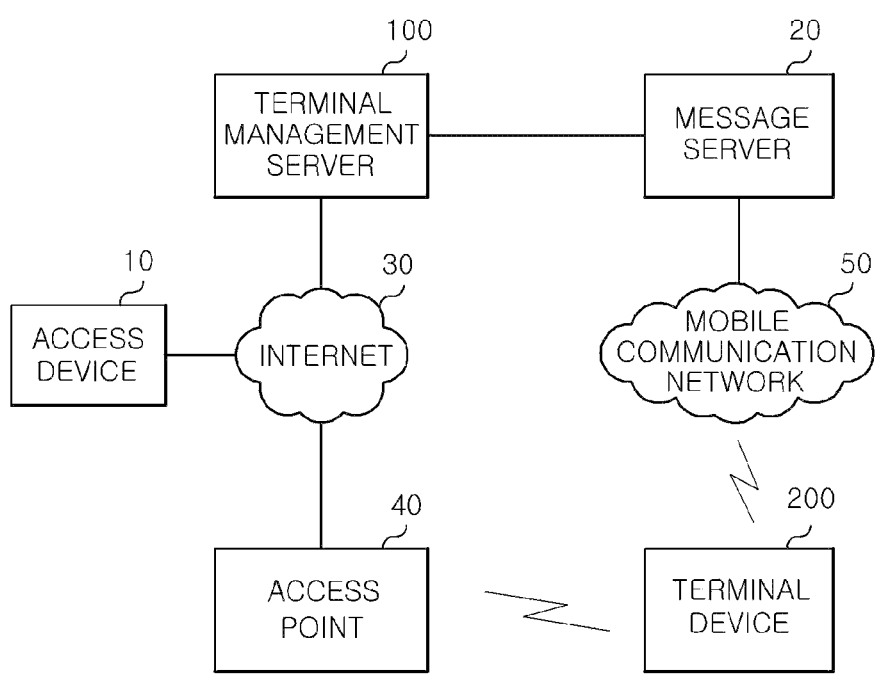
FIG. 1 is a configuration of a communication service network system including a terminal device and a terminal management server to which a method for protecting the terminal device is applied in accordance with at least one embodiment of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it makes the subject matter of the present disclosure rather unclear.

Additionally, in describing the components of the present disclosure, there are terms used like first, second, A, B, (a), and (b). These are solely for the purpose of differentiating one component from the other but not to imply or suggest the substances, order or sequence of the components. If a component were described as 'connected', 'coupled', or 'linked' to another component, they mean the components are not only directly 'connected', 'coupled', or 'linked' but also are indirectly 'connected', 'coupled', or 'linked' via a third component. The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

Herein, the term of "lock & wipe" function indicates the data (e.g., personal information such as private information, financial information, security information and so on) stored in the terminal device are kept safely by remotely locking the terminal device through a customized message and a secure passcode and wiping (i.e., deleting) the personal data (i.e., personal information) stored in the terminal device.

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

FIG. 1 is a configuration of a communication service network system including a terminal device and a terminal management server to which a method for protecting the terminal device is applied in accordance with at least one embodiment of the present disclosure.

As shown in FIG. 1, the communication service network system includes an access device 10, a terminal management server 100, a message server 20, the Internet 30, an access point device 40, a mobile communication network 50, and a terminal device 200. The terminal device 200 is loaded with a lock program for performing a method for protecting the terminal device in accordance with at least one embodiment of the present disclosure. Each of the access device 10, the terminal management server 100, the message server 20, the access point device 40, and the terminal device 200 is implemented by, or includes, one or more processors and/or application-specific integrated circuits (ASICs) specified for respectively corresponding operations and functions described herein in the present disclosure. Each of the access device 10, the terminal management server 100, the message server 20, the access point device 40, and the terminal device 200 includes a communication module (or a communication modem) to transmit and receive communication signals through the internet 30 and/or the mobile communication network 50. Herein, the mobile communication network 50 includes wireless networks for example, one or more network interfaces including, but not limited to, cellular, Wi-Fi, LAN, WAN, CDMA, WCDMA, GSM, LTE and EPC networks, and cloud computing networks.

The access device 10 is a communication terminal for accessing the terminal management server 100 through the Internet 30 to request terminal protection. The access device 10 is implemented as a mobile communication terminal device, for example, a smart phone, notepad or tablet computer, or a wired communication terminal device, for example, a PC (Personal Computer) to access the Internet 30 through a wired network.

The terminal management server 100 requests the message server 20 to command the terminal device 200 to access the terminal management server 100 when protection of the terminal device 200 is requested by the access device 10. Further, when the terminal device 200 has accessed the terminal management server 150 through the Internet 30 or the mobile communication network 50, the terminal management server 100 sends a terminal lock command to the terminal device 200 when the terminal device 200 is a terminal device to be protected. In this case, the terminal management server 100 send the terminal lock command to a terminal management application program stored and installed in a user area of the data storage area of the terminal device 200. Further, the terminal management server 100 sends the terminal lock command to a terminal locking program stored and installed in a non-user area of the data storage area of the terminal device 200. Components of the terminal management server 100 are described further below with reference to FIG. 2 in detail.

The message server 20 sends a message for commanding access to the terminal management server 100 to the terminal device 200 when the terminal management server requests the message server 20 to order (or command) the terminal device 200 to access the terminal management server 100.

The access point device 40 provides a wireless communication channel to enable the terminal device 200 to make a wireless connection to the Internet 30. For example, the access point device 40 provides a wireless communication channel to access a short-range mobile communication network connected to the Internet by using wireless transmission technology, for example, Wi-Fi or Bluetooth.

The mobile communication network 50 is implemented by one or a combination of various mobile communication systems such as the LTE (Long Term Evolution) communication system which uses the EPC (Evolved Packet Core) network, the WCDMA (Wideband Code Division Multiple Access) communication system, the GSM (Global System for Mobile) communication system, the CDMA (Code Division Multiple Access) communication system, and the TDMA (Time Division Multiple Access) communication system, but not limited thereto.

The terminal device 200 is implemented as a wireless communication terminal device, for example, a smart phone, notepad, or tablet computer, or is a wired communication terminal device provided with communication service through a wired network. In the aforementioned terminal device 200, a lock program for performing a method for protecting the terminal device in accordance with at least one embodiment of the present disclosure is stored and installed.

In particular, the terminal device 200 checks whether the terminal device is in a state of a preset condition for terminal protection, and locks itself by performing the terminal locking function to put itself into a locked state is when it is determined that the condition for terminal protection is satisfied. The terminal device 200 completely deletes an unlock key required for unlocking the locked state from the data storage areas. Components of the terminal device 200 are described further below with reference to FIG. 3 in detail.

The aforementioned terminal management server 100 and the terminal device 200 is configured based on the OMA-DM (Open Mobile Alliance Device Management) Standard, but complies with other data specifications or communication specifications, provided that they use the same protocols.

Figure 2:
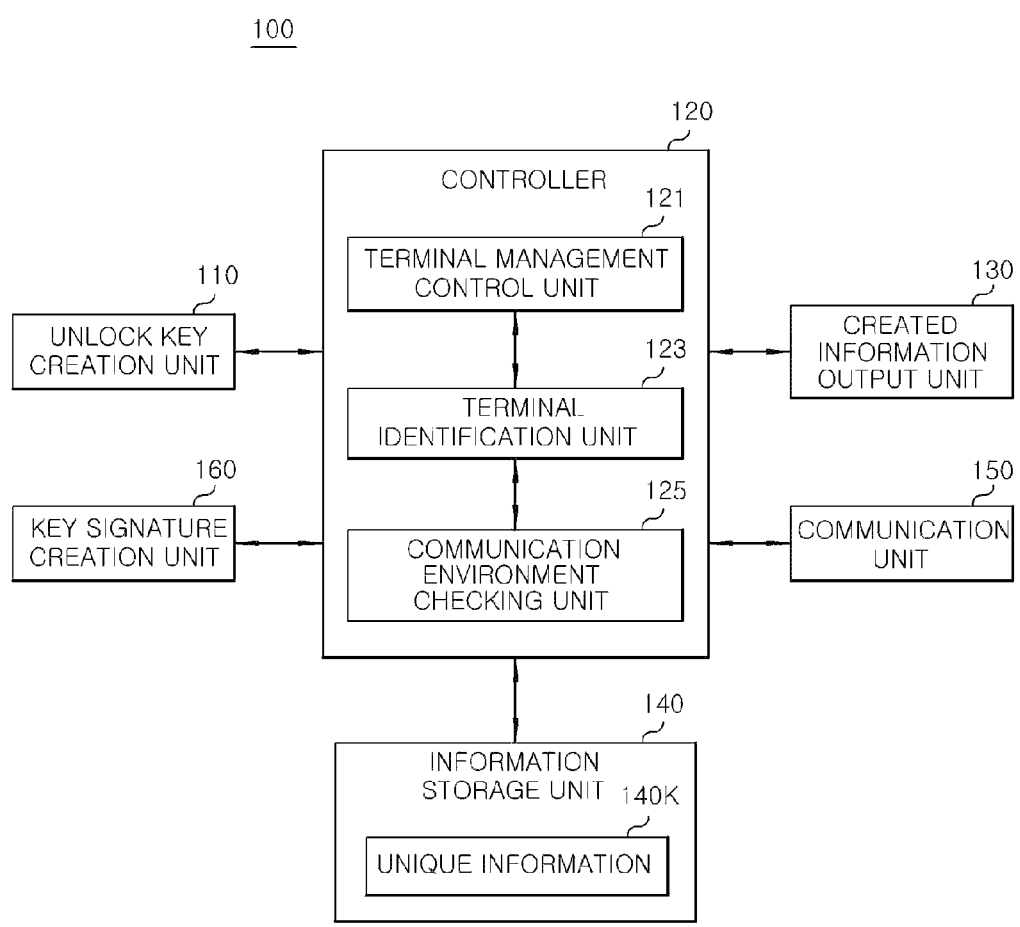
FIG. 2 is a detailed block diagram of the terminal management server shown in FIG. 1.

FIG. 2 is a detailed block diagram of the terminal management server 100 shown in FIG. 1.

As shown in FIG. 2, the terminal management server 100 includes an unlock key creation unit 110, a controller 120, a created information output unit 130, an information storage unit 140, a communication unit 150, and a key signature creation unit 160. The controller 120 includes a terminal management control unit 121, a terminal identification unit 123, and a communication environment checking unit 125. Each of the unlock key creation unit 110, the controller 120, the created information output unit 130, the communication unit 150, and the key signature creation unit 160 is implemented by, or includes, one or more processors and/or application-specific integrated circuits (ASICs) specified for respectively corresponding operations and functions described herein in the present disclosure. The communication unit 150 further includes a communication module to transmit and receive communication signals through the mobile communication network 50. The information storage unit 140 includes non-transitory computer readable recording medium to store unique information 140K, identification information and the password of the terminal device 200. Each component of the controller 130, such as the terminal management control unit 121, the terminal identification unit 123, and the communication environment checking unit 125 is implemented by, or includes, one or more processors and/or application-specific integrated circuits (ASICs) specified for respectively corresponding operations and functions described herein in the present disclosure.

The unlock key creation unit 110 creates an unlock key by the use of the identification information and the password of the terminal device 200. For example, the identification information is IMEI (International Mobile Equipment Identity), CPU (Central Processing Unit) information and IMSI (International Mobile Subscriber Identity) of the SIM (Subscriber Identity Module) of the terminal device 200.

The controller 120 controls operation processes of the terminal management server 100 including the process of creating an unlock key.

The terminal identification unit 123 of the controller 120 identifies whether the terminal device 200 is a terminal device to be protected depending on the result of comparing the identification information of the terminal device 200 received through the communication unit 150 with unique information stored in the information storage unit 140.

The communication environment checking unit 125 checks the current communication environment status of the terminal device to be protected. The communication environment checking unit 125 checks the current communication environment status of the terminal device to be protected depending on a communication channel through which the identification information of terminal device 200 is received among a plurality of communication channels.

The terminal management control unit 121 requests the message server 20 to command the terminal device 200 to access the terminal management server when the access device 10 requests protection of the terminal device 200. When the access device 10 provides unique information, for example, the identification information, of the terminal device 200 and requests protection of the terminal device 200, the terminal management control unit 121 stores the unique information of the terminal device 200 received through the communication unit 150 in the information storage unit 140. In addition, the terminal management control unit 121 sends a terminal lock command to the terminal device 200 to be protected through a communication channel allowed in the current communication environment status of the terminal device to be protected among a plurality of communication channels supported by the communication unit 150. The terminal management control unit 121 uses a communication channel which uses the mobile communication network 50 or a communication channel which uses the Internet 30 to send a terminal lock command. In this example, the terminal lock command further includes an unlock key deleting command. However, since the unlock key is wiped out after the terminal device 200 is locked by steps S507 and S509 shown in FIG. 6 to be described later, the same result is obtained regardless of whether the unlock key deleting command is included in the terminal lock command.

The information storage unit 140 stores unique information 140K including subscriber information and identification information for a terminal device 200 which is required to be locked among a plurality of terminal devices 200.

The communication unit 150 supports a plurality of communication channels for communication with the terminal device 200. The communication unit 150 supports communication channels which use the mobile communication network 50 and communication channels which use the Internet 30. Further, the communication unit 150 sends a terminal lock command and an unlock key deleting command under the control of the terminal management control unit 121 to the terminal device 200 corresponding to the shared information such as subscriber information and identification information, stored in the information storage unit 140 in order to lock the terminal device 200. The communication unit 150 sends the terminal lock command to the terminal management application program stored and installed in the user area among the data storage areas of the terminal device 200, or to the lock program stored and installed in the non-user area of the data storage area of the terminal device 200.

The key signature creation unit 160 uses a public key and a private key of the terminal device 200 to create a key signature value. The key signature value created as described above is recorded in the data storage area of the terminal device 200.

The created information output unit 130 outputs an unlock key and a key signature value in accordance with the control by the terminal management control unit 121 to enable them to be externally recognized and identified.

Figure 3:
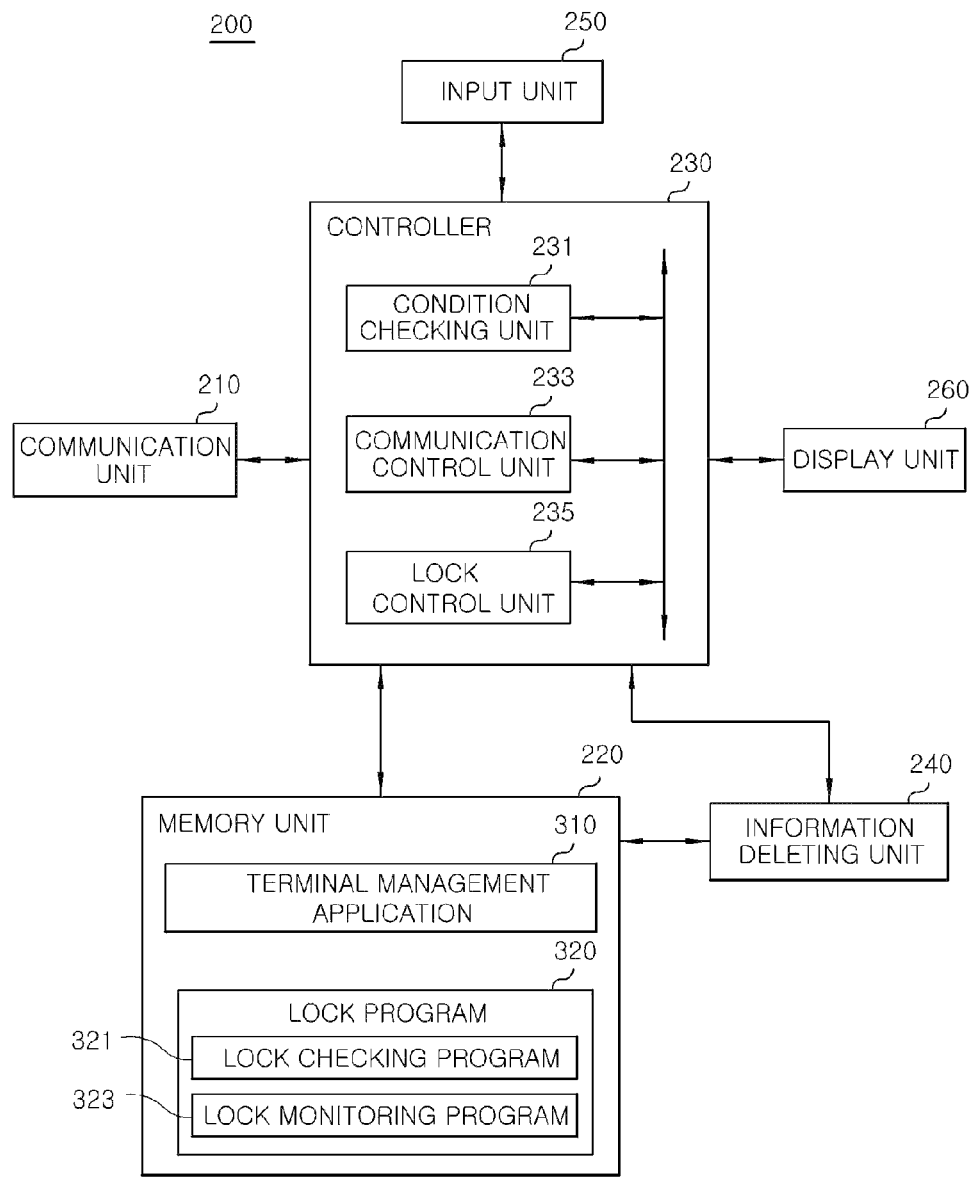
FIG. 3 is a detailed block diagram of the terminal device shown in FIG. 1.
Figure 4:
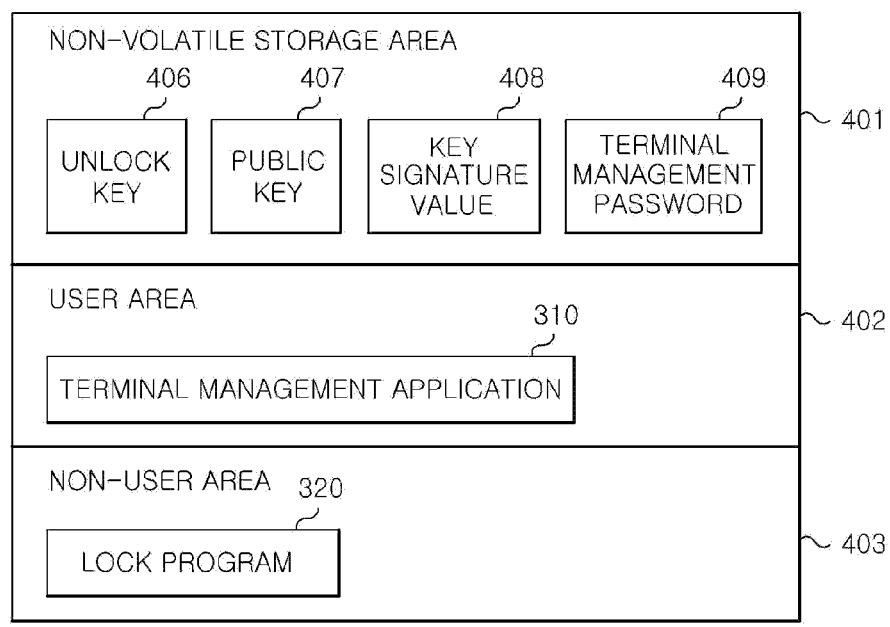
FIG. 4 is an exemplary allocation architecture for a data storage area in the memory unit shown in FIG. 3.

FIG. 3 is a detailed block diagram of the terminal device 200 shown in FIG. 1. FIG. 4 is an exemplary allocation architecture for a data storage area in the memory unit shown in FIG. 3

As shown in FIGS. 3 and 4, the terminal device 200 includes a communication unit 210, a memory unit 220, a controller 230, an information deleting unit 240, and an input unit 250. Each component of the communication unit 210, the controller 230 and the information deleting unit 240 is implemented by, or includes, one or more processors and/or application-specific integrated circuits (ASICs) specified for respectively corresponding operations and functions described herein in the present disclosure. The memory unit 220 includes non-transitory computer readable recording medium to store a terminal management application program 310 and a lock program 320. The input unit 250 includes for example, a touch screen, a keypad, a voice receiver, buttons and so on.

The memory unit 220 has a data storage area which stores the terminal management application program 310 and the lock program 320 therein. The lock program 320 for locking the terminal device includes a lock checking program 321 and a lock monitoring program 323.

The controller 230 includes a condition checking unit 231, a communication control unit 233, and a lock control unit 235. Each component of the condition checking unit 231, the communication control unit 233, and the lock control unit 235 is implemented by, or includes, one or more processors and/or application-specific integrated circuits (ASICs) specified for respectively corresponding operations and functions described herein in the present disclosure.

The communication unit 210 sends and/or receives signals (i.e., communication signals including data signals and/or control signals) for wireless or wired communication of the terminal device 200. The signals includes packet data for communication functions of the terminal device 200, unique identification information for a terminal locking function and lock commands. To this end, the communication unit 210 includes a transmitter for up-converting and amplifying the frequencies of signals to be sent and a receiver for low-noise-amplifying received signals and down-converting the frequencies of the received signals. The communication unit 210 accesses the terminal management server 100 through the communication channel. The communication unit 210 sends unique identification information through a communication channel, and receives a lock command issued by, and received from, the terminal management server 100 to provide it to the controller 230.

The data storage area of the memory unit 220 includes a memory unit allocation architecture including a non-volatile storage area 401 which is not reset when the terminal device is initialized, a user area 402, and a non-user area 403 as shown in FIG. 4.

The non-volatile storage area 401 is a data storage area which is not reset when the terminal device initialized, and information stored therein is not changed when installing custom firmware through rooting.

The non-volatile storage area 401 temporarily stores an unlock key 406 required for unlocking the terminal device 200 locked by the lock program 320 stored in the non-user area 403. The unlock key 406 is completely deleted by the information deleting unit 240 when the terminal device is determined to be in a state of the preset condition for terminal protection by the condition checking unit 231.

Also, the non-volatile storage area 401 stores a key signature value 408 created by using a public key and a private key of the terminal device 200, and the public key 407 used to create the key signature value 408.

In addition, the non-volatile storage area 401 stores a terminal management password 409 required for unlocking the terminal device 200 locked by the terminal management application program 310 stored and installed in the user area 402.

The user area 402 stores a variety of applications installed in the terminal device 200 by a user, and settings of the applications. One of the applications stored in the user area 402 is the terminal management application program 310 for locking the screen and functions by locking the terminal device 200 or wiping out the information stored in the terminal device 200 when a lock command by the terminal management server 100 for locking the terminal device 200 is received.

The user area 402 refers to a data storage area which is reset when initializing the terminal device and the terminal management application program 310 is also deleted when initializing the terminal device.

The non-user area 403 refers to a storage area except the non-volatile storage area 401 and the user area 402 in the data storage area of the memory unit 220. The non-user area 403 is a data storage area in which stored information is wiped out when installing custom firmware through rooting, but not reset when initializing the terminal device. The memory unit allocation architecture of the non-user area 403 includes a secure boot area, a boot loader area, and a root file system/kernel area which have higher safety against rooting in that order. For example, storing and installing the lock program 320 in the secure boot area maximizes safety against rooting.

The non-user area 403 is for comparing an authentication unlock key for authentication created by using an entered password and the identification information of the terminal device 200 with the unlock key 406 stored in the non-volatile storage area 401 to perform authentication. The non-user area 403 stores the lock program 320 for locking the terminal device 200 depending on the result of authentication or the result obtained by checking the condition for terminal protection by the condition checking unit 231. The lock program 320 is driven when booting the terminal device 200 starts as the OS (Operating System) program stored in the non-user area 403 is executed to detect whether the terminal management application program 310 exists in the user area 402. If or when the terminal management application program 310 does not exists in the user area 402, the lock program 320 locks the terminal device 200 to put in into a locked state.

Figure 5:
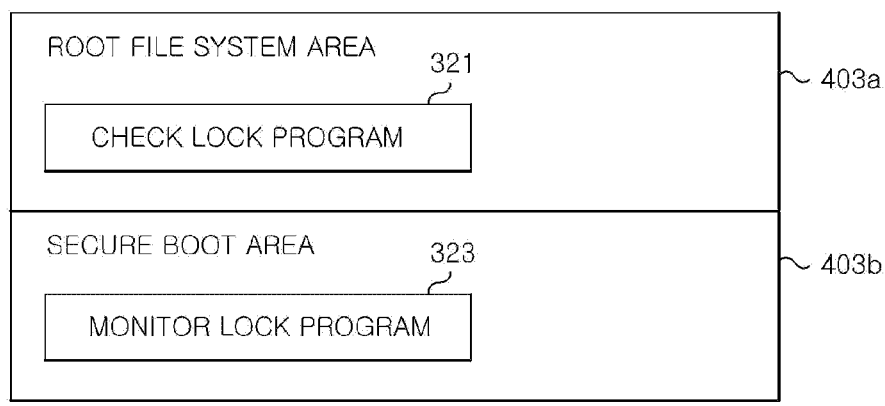
FIG. 5 is an exemplary allocation architecture for data storage area of the non-user area shown in FIG. 4.

The lock program 320 includes a lock checking program 321 stored and installed in a root file system area 403a and a lock monitoring program 323 stored and installed in a secure boot area 403b as shown in FIG. 5.

The lock checking program 321 among the aforementioned programs uses the public key 407 to verify whether the key signature value 408 is a normal value while performing all functions of the lock program 320.

The lock monitoring program 323 is driven when booting the terminal device 200 starts to detect whether the lock checking program 321 exists in the root file system area 403a. If or when the lock checking program 321 does not exist in the root file system area 403a, the lock program 320 locks the terminal device 200 to put it into a locked state.

By installing and storing only the lock monitoring program 323 in the secure boot area 403b and the lock checking program 321 for checking the terminal management application program separately in the root file system area 403a as in the example shown in FIG. 5, booting speed is improved compared with the example shown in FIG. 4.

The controller 230 includes a condition checking unit 231, which is operated in accordance with booting as the OS program stored in the memory unit 220 is executed, and execution of the terminal managing/locking programs such as the terminal management application program 310, the lock program 320, the lock checking program 321 and the lock monitoring program 323. The controller 230 also includes a communication controller 233 and a lock controller 235. The controller 230 is implemented by a CPU (Central Processing Unit) or an AP (Application Processor).

The condition checking unit 231 of the controller 230 monitors the operation state of the terminal device 200 in accordance with execution of the terminal management/lock programs to determine whether the terminal device is in a state of the preset condition for terminal protection. In this example, the condition checking unit 231 determines whether the terminal device is in a state of the preset condition for terminal protection by determining whether a preset manipulation (i.e., an operation or a manipulation corresponding to the preset condition, hereinafter referred to as "preset condition" for concise description of the present disclosure) occurs while the terminal device 200 is operated. For example, the preset manipulation (i.e., the preset condition) includes at least one of deletion of a predetermined application such as the terminal management/lock programs, SIM (Subscriber Identity Module) separation away from the terminal device 200, SIM replacement which is occurred in the terminal device 200, and a country code change or a firmware update which is performed or occurred in the terminal device 200.

The communication control unit 233 of the controller 230 controls the communication unit 210 to access the terminal management server 100, controls the communication unit 210 to send unique identification information of the terminal device 200 to the terminal management server 100, and receives a lock command from the terminal management server 100 to send it to the controller 230. Further, the communication control unit 233 controls the communication unit 210 for sending/receiving signals for communication services, for example, telephone calls of the terminal device 200.

The lock control unit 235 of the controller 230 locks the terminal device by executing the terminal management/lock program stored in the memory unit 220 when a lock command is issued by, and received from, the terminal management server 100. For example, the lock control unit 235 locks the screen and functions of the terminal device 200, or wipe out the information stored in the terminal device 200.

The information deleting unit 240 deletes the unlock key 406 required for unlocking the locked terminal device from the non-volatile storage area 401 of the memory unit 220 in accordance with the control of the lock control unit 235.

The input unit 250 creates and sends input signals by user's key operation for controlling the terminal device 200 to the controller 230. The input unit 250 is implemented by a keypad or keyboard including mechanical-type buttons, of by an unit such as a touch screen integrated with output means.

The display unit 260 is implemented as various visual output devices including a flat panel display, for example, an LCD (Liquid Crystal Display) and OLED (Organic Light Emitting Diode). The display 260 visually provides the menu of the terminal device 200, input data, functional setup information and other information to the terminal device user. The display unit 260 presents a booting screen, a waiting screen, a menu screen, other application program screens, and operation screens of the terminal device 200. When the lock control unit 235 locks the terminal device, the display unit 260 displays a terminal locking screen and a message for restriction of sending/receiving data and calls and all established functions except emergency calls, on its screen. For example, the display 260 is implemented to be integrated with input means, for example, a touch screen.

Meanwhile, although not shown in FIG. 3, the memory unit 220 includes a SIM if the terminal device 200 is implemented as a mobile communication terminal device, for example, a smart phone. For example, the memory unit 220 includes a USIM card equipped in a mobile communication terminal device, for example, a smart phone.

If the specific functions of communication, for example, voice communication and data communication, are not included in the terminal device 200 described above, some of the communication unit 210, the memory unit 220, the controller 230, the input unit 250 and the display 260 or some functions thereof is removed or limited. In addition, the function of the communication control unit 233 included in the controller 230 is partially limited.

Figure 6:
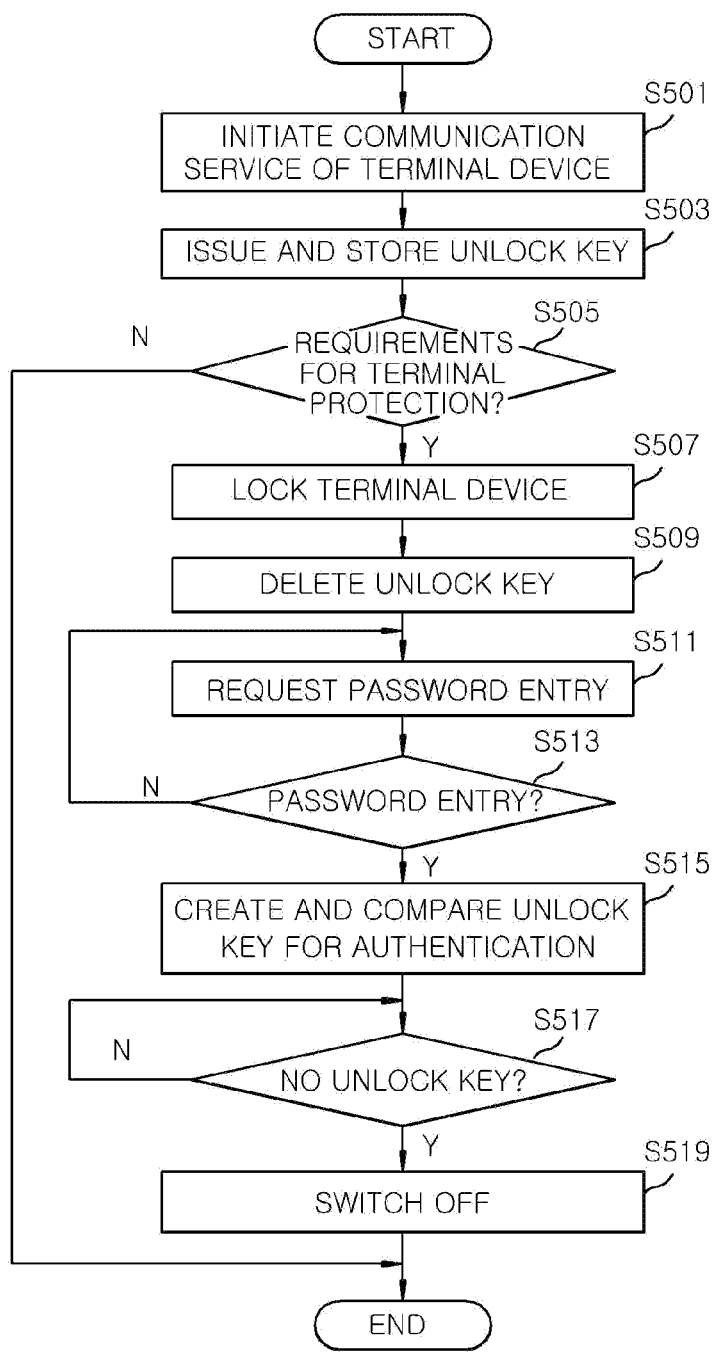
FIG. 6 is a flow diagram of a method for protecting a terminal device in accordance with at least one embodiment of the present disclosure.

FIG. 6 is a flow diagram for illustrating a method for protecting a terminal device in accordance with at least one embodiment of the present disclosure.

As shown in FIG. 6, the method for protecting a terminal device in accordance with at least one embodiment of the present disclosure includes steps S501 and S503 for issuing an unlock key and storing it in the terminal device 200 when initiating communication service of the terminal device 200.

The method further includes step S505 for checking whether the terminal device 200 satisfies the preset condition for terminal protection. In this case, the condition for terminal protection is a case when a lock command from the terminal management server 100 for remotely managing the terminal device 200 is received, or a case where a preset manipulation (i.e., a preset condition) for the terminal 200 occurs. For example, the preset manipulation (i.e., the preset condition) includes at least one of deletion of a preset application programs, SIM separation away from the terminal device 200, SIM replacement which is occurred in the terminal device 200, and a country code change or a firmware update which is performed or occurred in the terminal device 200. In addition, the method further includes step S507 for locking the terminal device 200 to put it into a locked state when the terminal device 200 is determined to be in a state of the preset condition for terminal protection, and step S509 for deleting the unlock key 406 required for unlocking the locked terminal device 200 from the memory unit 220 of the terminal device 200.

Steps S511 to S519 illustrate a case when the terminal device 200 is unlocked because the unlock key 406 required for unlocking the locked terminal device 200 has been deleted.

To this end, the method includes step S511 for requesting password entry while the terminal device 200 is locked, and step S515 for creating an authentication unlock key for authentication by using an entered password and the identification information of the terminal device 200 and then comparing the created unlock key with the unlock key 406 that has to be stored in the terminal device 200 by the lock program 320.

In addition, the method further includes step S517 in which absence of the unlock key 406 is found because the unlock key 406 to be compared with the unlock key 406 for authentication has already been deleted step S509, and step S519 for switching off the terminal device 200 to fundamentally prevent illegal use thereof because the unlock key 406 does not exist.

Figure 9:
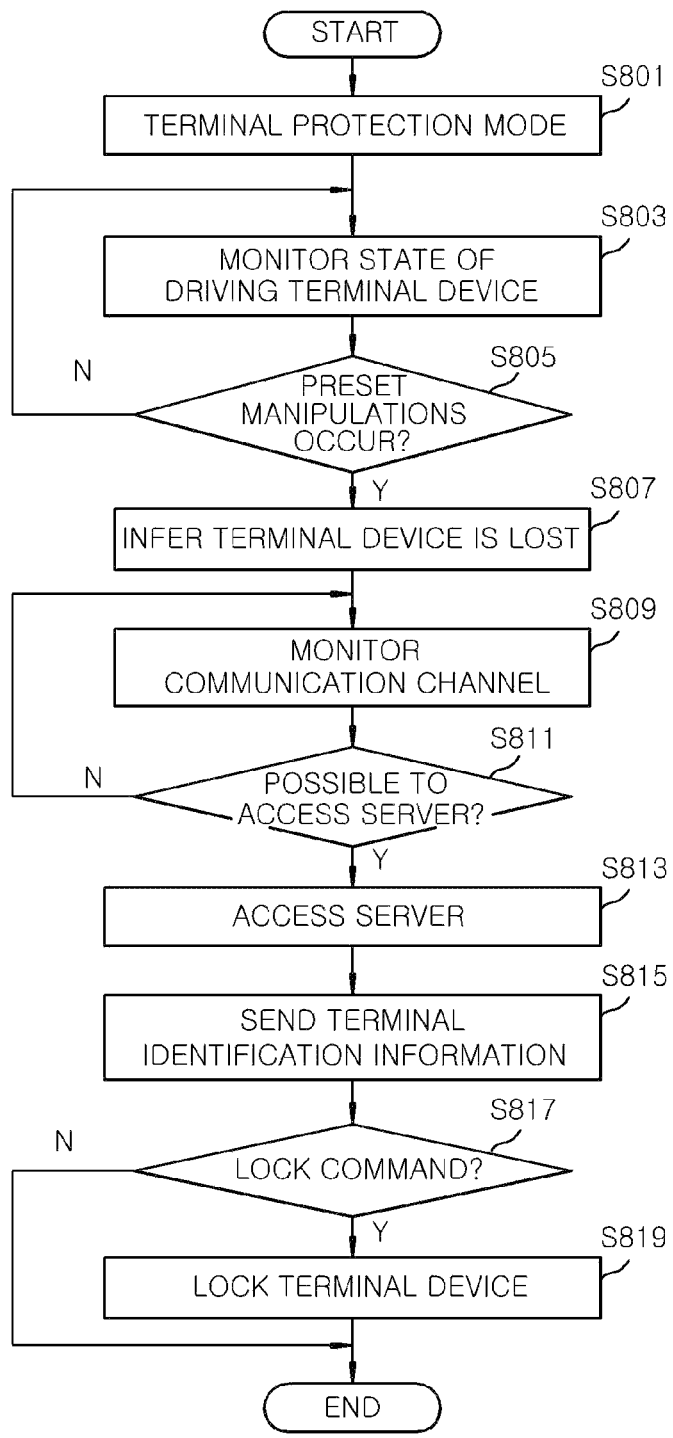
FIG. 9 is a flow diagram of transferring a terminal device locking command and an unlock key deleted command from the terminal management server to the terminal device by the method for protecting the terminal device in accordance with at least one embodiment of the present disclosure.

In the aforementioned embodiment described with reference FIG. 6, while the terminal device 200 is automatically locked at step S507 if the condition for terminal protection is satisfied at step S505, the terminal device 200 is locked after waiting until a lock command is received from the terminal management server 100. In accordance with at least one embodiment, FIG. 9 shows a process of transferring lock and unlock terminal commands from the terminal management server 100 to the terminal device 200.

A user who wants to lock the terminal device 200 uses the access device 10 to access the terminal management server 100 through the Internet 30, and provides unique information, for example, the identification information of the terminal device 200 and requests protection of the terminal device 200. For example, the user provides a subscriber number or the IMEI (International Mobile Equipment Identity) of the terminal device 200 as identification information.

Subsequently, the terminal management control unit 121 of the terminal management server 100 stores unique information, for example, the identification information of the terminal device 200 received through the communication unit 150 in the information storage unit 140. In this case, the terminal management control unit 121 also requests the message server 20 to command the terminal device 200 to access the terminal management server 100, and the terminal message server 100 sends a message for commanding the terminal device 200 to access the terminal management server 100 to the terminal device 200.

If or when the terminal device 200 receives the message for commanding the terminal device 200 to access the terminal management server 100, the terminal device 200 accesses the terminal management server 100 through the mobile communication network 50 in accordance with the message for commanding the terminal device 200 to access the terminal management server 100. However, if or when the terminal device 200 fails to receive the message for various reasons, the terminal management server 100 is unable to send a control command to the terminal device 200.

For example, if or when a finder of the terminal device 200 removes the SIM thereof, for example, USIM from the terminal device 200 or replaces the SIM with a new one while the terminal device 200 is lost, subscriber authentication of the terminal device 200 fails. Therefore, since the terminal device 200 is unable to register its location with the mobile communication network 50, receiving a control message fails. In the case where the finder of the terminal device 200 switches off the terminal device 200, since the terminal device 200 is unable to access the mobile communication network 50 receiving the control message fails.

However, in case where the terminal device 200 is loaded with the terminal management application program 310 for performing the method for terminal protection in accordance with at least one embodiment of the present disclosure even though the message for commanding the terminal device 200 to access the terminal management server 100 is not received from the terminal management server 100, locking the terminal device 200 is implemented because the terminal management application program 310 is executed when booting the terminal device 200. If or when the terminal device 200 is switched off, the terminal management application program 310 stored in the memory unit 220 interworks and is executed immediately when the terminal device 200 is booted even once after switch-off thereof.

In the terminal protection mode at stage S801 in executing the aforementioned terminal management application program 310, the condition checking unit 231 of the terminal device 200 monitors the operation state of the terminal device 200 at step S803 to check whether a preset manipulation (i.e., operation or manipulation corresponding to the preset condition) occurs at step S805. For example, the condition checking unit 231 checks whether the preset manipulation (i.e., the preset condition) occurs. For example, the preset manipulation includes at least one of SIM separation away from the terminal device 200, SIM replacement which is occurred in the terminal device 200, and a country code change or firmware update which is performed or occurred in the terminal device 200. Since changing the country code implies a roaming environment, illegal use of the terminal device 200 is highly occurred. In addition, custom firmware update after rooting implies high probability of illegal use.

Thereafter, when it is determined that a preset manipulation occurs by the condition checking unit 231, the controller 230 determines that the terminal device 200 is lost at step S807. The communication control unit 233 of the controller 230 monitors the communication channel of the communication unit 210 at step S809 to check whether access to the terminal management server 100 is available to be performed at step S811. If or when access the terminal management server 100 is not available since there is no communication channel, the communication control unit 233 continues to monitor the communication unit 210 until a communication channel is connected.

In this case, the access point device 40 provides a wireless communication channel, for example, Wi-Fi or Bluetooth of a wireless communication network to enable the terminal device 200 to be in wireless connection to the Internet 30. In addition, if or when the terminal device 200 is switched on while its SIM is normally equipped therein, a communication channel is provided by the mobile communication network 50.

As described above, when a communication channel is connected, the communication control unit 233 controls the communication unit 210 to access the terminal management server 100 through the Internet 30 or the mobile communication network 50 at step S813. In this case, the communication control unit 233 controls the communication unit 210 to access the terminal management server 100 by using location information stored in the memory unit 220

In addition, after the terminal device 200 is connected to the terminal management server 100, the communication control unit 233 controls the communication unit 210 to send unique identification information stored in the memory unit 220 to the terminal management server 100 at step S815.

Subsequently, the terminal management server 100 compares the identification information (i.e., referred to as "first identification information" for concise description of the present disclosure) of the terminal device 200 requested to be protected with the unique information (i.e., referred to as "second identification information" for concise description of the present disclosure) stored in the information storage unit 140 at step S817. If or when both of the identification information (i.e., the first identification information and the second identification information) matches each other in the comparison, a lock command is sent to the terminal device 200. If or when the first identification information is equal or identical to the second identification information, the terminal management server 100 sends a lock command to the terminal device 200.

In the processing process of the terminal management server 100, the terminal identification unit 123 compares the identification information of the terminal device 200 received through the communication unit 150 with unique information (i.e., the identification information) stored in the information storage unit 140. If or when both the identification information matches each other in the comparison, it is determined by the terminal identification unit 123 that the terminal device 200 is a terminal device to be protected. If or when the identification information of the terminal device 200 received through the communication unit 150 is equal or identical to the unique information (i.e., the identification information) stored in the information storage unit 140, the terminal management server 100 determines that the terminal device 200 is identified as a device (i.e., an entity) subject to be protected.

During the above step, the communication environment checking unit 125 checks the communication environment status of the terminal device 200 to be protected depending on the communication channel through which the identification information of the terminal device 200 is received among a plurality of communication channels supported by the communication unit 150. For example, if or when the identification information of the terminal device 200 is received through the mobile communication network 50, the communication environment checking unit 125 determines that the communication environment status of the terminal device 200 identified as a terminal device to be protected allows the mobile communication network 50 to be used and SMS (Short Message Service) messages is received through the mobile communication network 50. In other cases, if or when the identification information of the terminal device 200 is received through the Internet 30, the communication environment checking unit 125 determines that the communication environment status of the terminal device 200 identified as a terminal device to be protected allows access to the Internet 30 through a short-range wireless communication network, such as Wi-Fi or Bluetooth, and reception of push messages through the Internet 30.

After that, the terminal management control unit 121 sends a terminal lock command to the terminal device 200 through a communication channel allowed in the communication environment status of the terminal device 200 identified as a terminal device to be protected among a plurality of communication channels supported by the communication unit 150. For example, if or when the terminal device 200 identified as a terminal device to be protected is allowed to use the mobile communication network 50, the terminal management control unit 121 sends a terminal lock command and an unlock key deleting command as an SMS message through the mobile communication network 50. In other cases, if or when the terminal device 200 identified as a terminal device to be protected is allowed to use the Internet 30, the terminal management control unit 121 sends the terminal lock command and the unlock key command as a push message through the Internet 30.

As described above, when a lock command is issued by the terminal management server 100, the lock control unit 235 of the terminal device 200 locks the terminal device 200 by executing the terminal management application program stored in the memory unit 220. The information deleting unit 240 deletes the unlock key 406 required for unlocking the locked terminal device from the non-volatile storage area 401 of the memory unit 220 under the control of the lock control unit 235 at step S819.

Figure 7A:
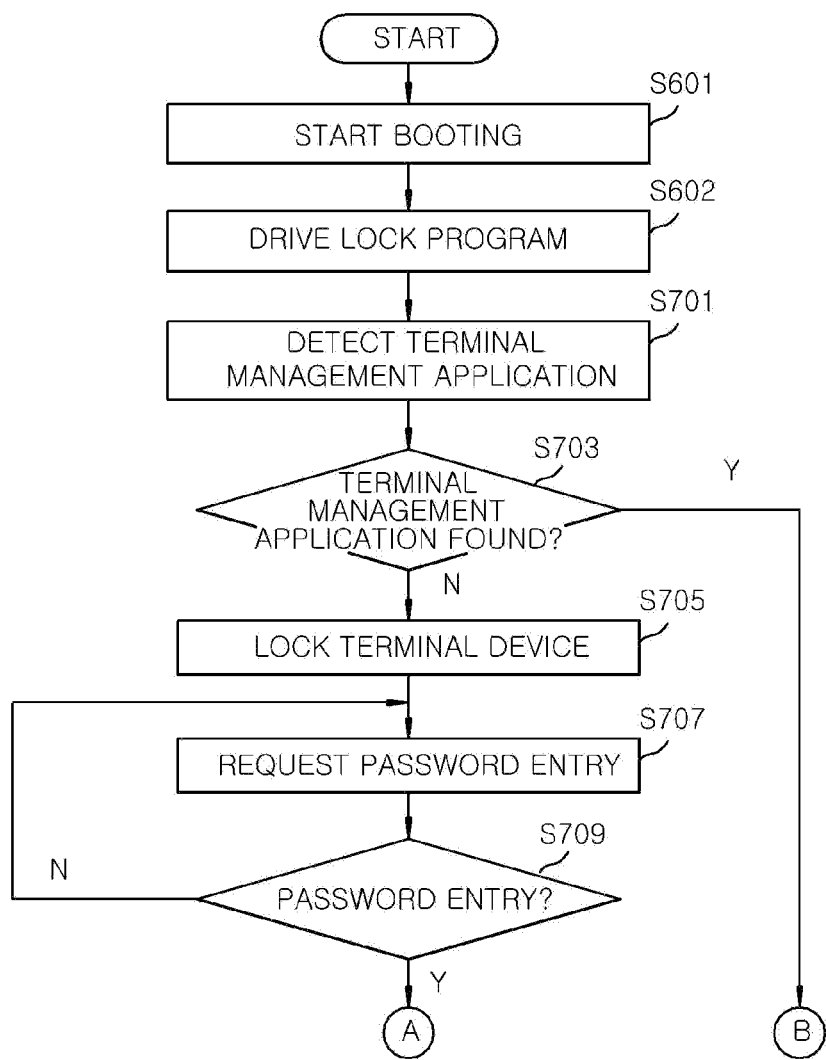
FIGS. 7A and 7B are a flow diagram of exemplary processes of booting a terminal device in which a program for performing the method for protecting the terminal device is stored in a data storage area in accordance with at least one embodiment of the present disclosure.
Figure 7B:
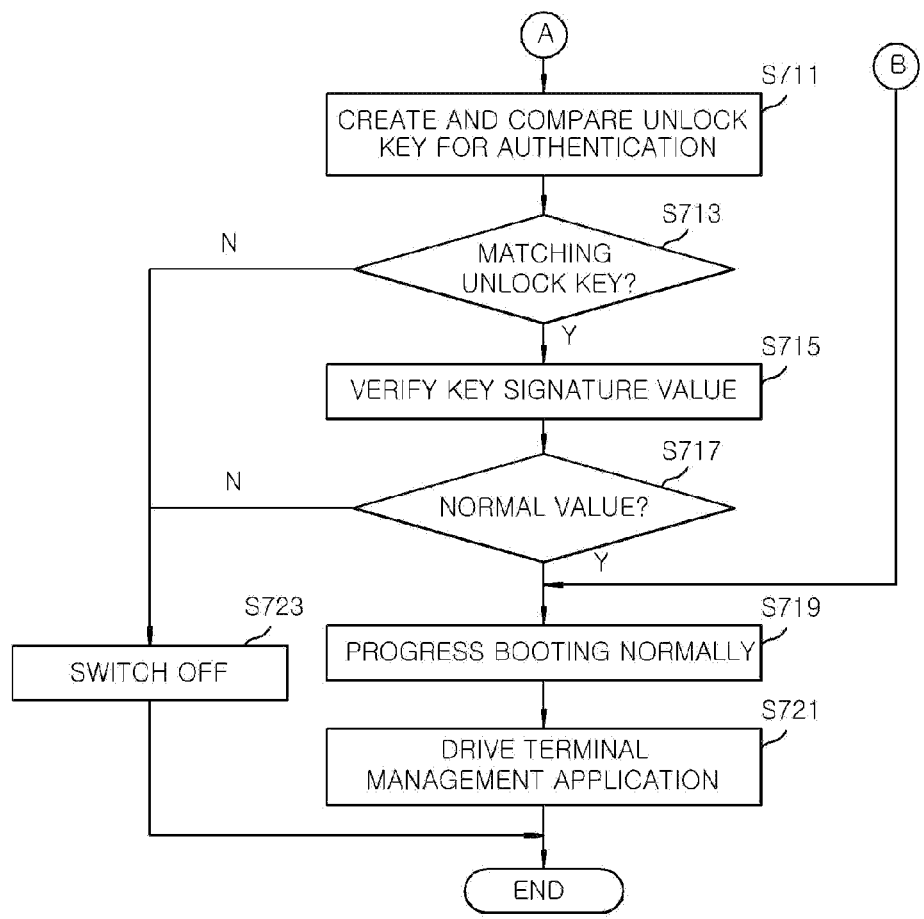

FIGS. 7A and 7B are a flow diagram of exemplary processes of booting the terminal device 200 in which a program for performing the method for protecting the terminal device 200 is stored in a data storage area in accordance with at least one embodiment of the present disclosure. This is based on the case that the lock program 320 is installed and stored in the non-user area 403 shown in the example of FIG. 4.

First, when booting the terminal device 200 starts at step S601, the lock program 320 installed in the non-user area 403 of the memory unit 220 is driven at step S602. The condition checking unit 231 of the controller 230 then checks whether the terminal device is in a state of the preset condition for terminal protection. In this case, the condition checking unit 231 detects whether the terminal management application program 310 is installed in the user area 402 at step S701.

Next, if the terminal management application program 310 of the user area 402 is wiped out by a finder of the terminal device 200 while it is lost, the condition checking unit 231 determines that the terminal device is in a state of the preset condition for terminal protection at step S703.

As a result of the decision, the lock control unit 235 locks the terminal device 200 to put it into locked at step S705.

However, if or when the terminal management application program 310 is normally installed in the user area 402, the condition checking unit 231 determines, at step S703, that the preset condition for terminal protection are not met. Then, at step S719, normal booting progresses, and at step S721, the terminal management application program 310 installed in the user area is driven.

Meanwhile, a normal user of the terminal device 200 is authorized to delete the terminal management application program 310 installed in the user area 402. Even if the terminal management application program 310 is deleted, the user is able to normally use the terminal device 200. Steps S707 to S723 illustrate the process for this purpose.

At step S707, password entry is requested while the terminal device 200 is locked. When a password is entered at step S709, the lock program 320 uses the entered password and the identification information of the terminal device 200 to create an unlock key for authentication, and compares the created unlock key for authentication with the unlock key 406 stored in the non-volatile storage area 401 of the memory unit 220 at step S711.

In this case, a normal user of the terminal device 200 receives, from an operator, a password for creating an unlock key used by the unlock key creation unit 110, and the received password is at step S709.

If or when the unlock key for authentication does not match (i.e., is not identical to) the unlock key 406 stored in the non-volatile storage area 401 of the memory unit 220 at step S713, the lock control unit 235 determines that a situation of an abnormal use occurs, and then the lock control unit switches off the terminal device 200 at step S723. If or when the unlock key 406 has been already deleted by the information deleting unit 240, absence of the unlock key 406 is found as in step S517 in FIG. 6 and the terminal device 200 is also switched off. To avoid this, the terminal management control unit 121 of the terminal management server 100 sends the unlock key created by the unlock key creation unit 110 to the terminal device 200 through the communication unit 150. The terminal device 200 stores the unlock key provided by the terminal management server 100 again in the non-volatile storage area 401 of the memory unit 220.

Next, as the lock program 320 is driven, the lock control unit 235 uses the public key 407 stored in the non-volatile storage area 401 of the memory unit 220 to verify the key signature value 408 at step S715. If or when the key signature value 408 is identified as an effective normal value, booting normally progresses at step S719. However, if or when it is verified as an ineffective value, the terminal device 200 is switched off at step S723.

Figure 8A:
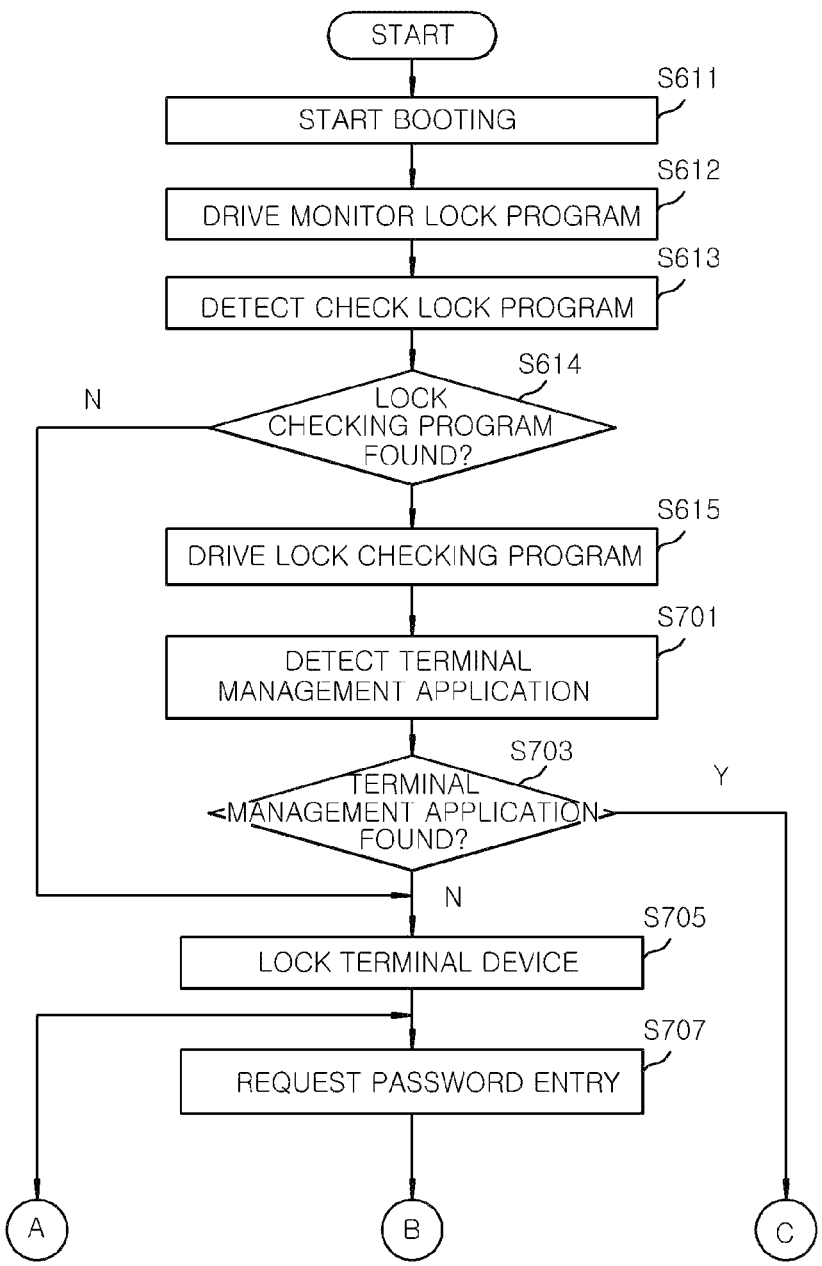
FIGS. 8A and 8B are a flow diagram of another exemplary processes of booting a terminal device in which a program for performing the method for protecting the terminal device is stored in a data storage area in accordance with at least one embodiment of the present disclosure.
Figure 8B:
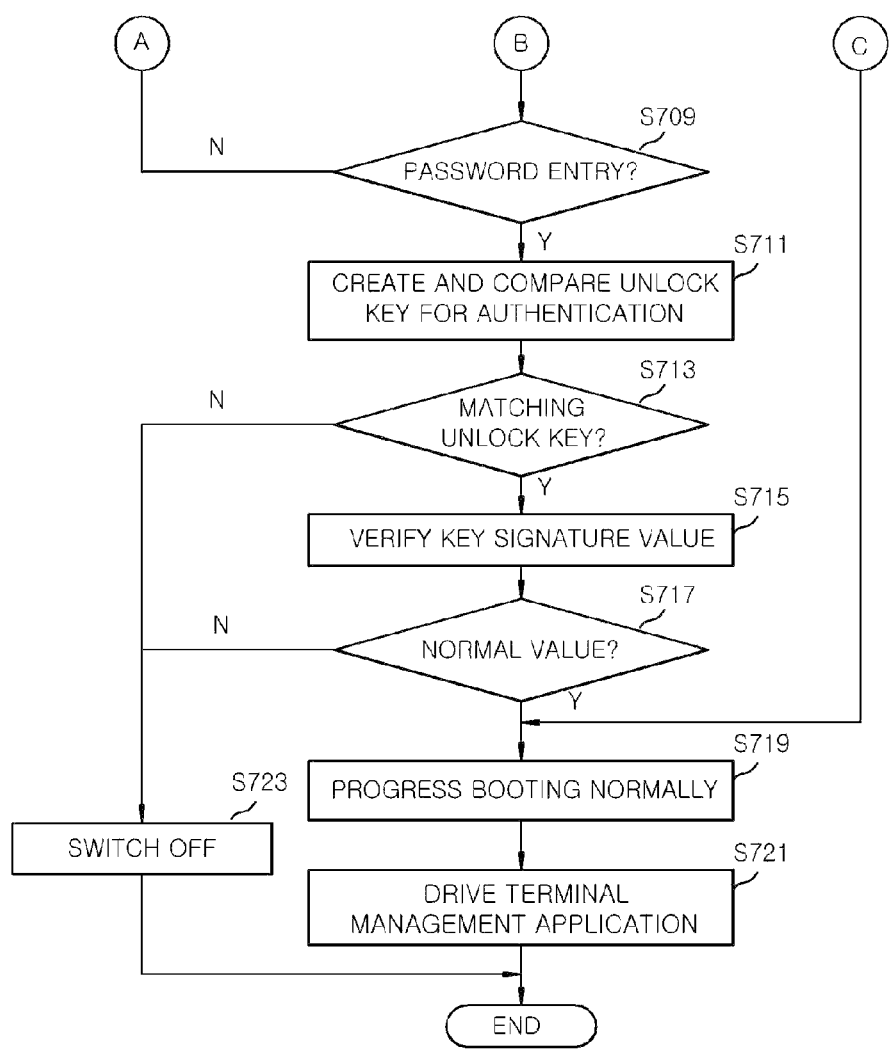

FIGS. 8A and 8B are a flow diagram of another exemplary process of booting the terminal device 200 in which a program for performing the method for protecting the terminal device 200 is recorded in a data storage area in accordance with at least one embodiment of the present disclosure. This is the case that the lock checking program 321 is stored and installed in the root file system area 403a and the lock monitoring program 323 is stored and installed in the secure boot area 403b as shown in FIG. 5.

First, when booting the terminal device 200 starts at step S611, the lock monitoring program 323 installed in the secure boot area 403b of the memory unit 220 is driven at step S612, and the condition checking unit 231 of the controller 230 checks whether the terminal device is in a state of the preset condition for terminal protection as the lock monitoring program 323 is driven. In this case, the condition checking unit 231 detects whether the lock checking program 321 is installed in the root file system area 403a at step S613.

In this case, if or when the lock checking program 321 is deleted from the root file system area 403a by a finder of the terminal device 200 while it is lost, the condition checking unit 231 determines that the terminal device is in a state of the preset condition for terminal protection at step S614.

As a result of the decision, the lock control unit 235 locks the terminal device 200 and to put it into a locked state at step S705.

However, if or when the lock checking program 321 is normally installed in the root file system area 403a, the lock checking program 321 is normally driven at step S615.

Furthermore, as the lock checking program 321 is driven, the condition checking unit 231 of the controller 230 checks whether the terminal device is in a state of the preset condition for terminal protection. In this case, the condition checking unit 231 detects whether the terminal management application program 310 is installed in the user area 402 at step S701.

In this case, if or when the terminal management application program 310 of the user area 402 is deleted by the finder of the terminal device 200 while it is lost, the condition checking unit 231 determines that the terminal device is in a state of the preset condition for terminal protection at step S703.

As a result of the decision, the lock control unit 235 locks the terminal device 200 to put it into a locked state at step S705.

However, if or when the terminal management application program 310 is normally installed in the user area 402, the condition checking unit 231 determines that the terminal device is not in a state of the preset condition for terminal protection at step S703. As a result of the decision, booting the terminal device 200 normally progresses at step S719, and the terminal management application program 310 installed in the user area is driven at step S721.

Meanwhile, a normal user of the terminal device 200 is authorized to delete the terminal management application program 310 installed in the user area 402 or delete the lock checking program 321 of the root file system area 403a. Even if the terminal management application program 310 and/or the lock checking program 321 are/is deleted, the user is allowed to use the terminal device 200. Steps S707 to S723 illustrate the process for this purpose. In this case, authorizing the user to delete the lock checking program 321 of the root file system area 403a implies the user is authorized to install custom firmware through rooting.

While the terminal device 200 is locked, it is requested to enter a password at step S707. When the password is entered at step S709, the lock checking program 321 uses the entered password and the identification information of the terminal device 200 to create an unlock key for authentication to compare the created unlock key for authentication with the unlock key 406 stored in the non-volatile storage area 401 of the memory unit 220 at step S711.

In this case, if or when the user is a normal user of the terminal device 200, the user receives from an operator, a password used for creating an unlock key with the unlock key creation unit 110 of the terminal management server 100, and enters the password received at step S709.

If or when the unlock key for authentication does not match (i.e., is not identical to) the unlock key 406 stored in the non-volatile storage area 401 of the memory unit 220 at step S713, the lock control unit 235 determines that a situation of an abnormal use occurs and switches off the terminal device 200 at step S723. If or when the unlock key 406 has been already deleted by the information deleting unit 240, absence of the unlock key 406 is not found as in step S517 in FIG. 6, and the terminal device 200 would be switched off. To avoid this, the terminal management control unit 121 of the terminal management server 100 sends the unlock key created by the unlock key creation unit 110 to the terminal device 200 through the communication unit 150, and the terminal device 200 stores the unlock key received from terminal management server 100 again in the non-volatile storage area 401 of the memory unit 220.

Next, as the lock checking program 321 is driven, the lock control unit 235 uses the public key 407 stored in the non-volatile storage area 401 of the memory unit 220 to verify the key signature value 408 at step S715. When the key signature value 408 is verified as an effective normal value, booting the terminal device 200 normally progresses at step S719. However, when it is verified as an ineffective value, the lock control unit 235 switches off the terminal device 200 at step S723.

As described above, in accordance with the at least one embodiment of the present disclosure, the terminal device 200 is locked to put itself into a locked state when the state of the terminal device 200 satisfies the preset condition for terminal protection (i.e., when the terminal device 200 is determined to be in a state of the preset condition for terminal protection). Since the unlock key 406 required for unlocking the locked terminal device is completely deleted from the terminal device 200, high security is ensured by fundamentally avoiding the concern about exposure of the unlock key 406 through hacking.

In addition, booting the terminal device 200 normally progresses only when the terminal management application program 310 and/or the lock checking program 321 are/is installed. Therefore, even in a case when the terminal management application program is deleted through factory-reset, rooting or installation of custom firmware, the terminal device is able to be prevented from illegal and/or unlawful use thereof even when and/or while it is lost.

In accordance with various embodiments of the present disclosure, when the terminal device meets the preset condition for terminal protection, the terminal device is locked to change the status into locked. Since the unlock key required for unlocking the locked terminal device is completely wiped out from the terminal device, high security is ensured by fundamentally avoiding the concern about exposure of the unlock key by hacking.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

The invention claimed is:

1. A terminal device comprising:
   a memory unit configured to store a lock program for locking the terminal device;
   a condition checking unit configured to determine whether the terminal device is in a state of a preset condition for terminal protection when the lock program is executed;
   a lock control unit configured to allow the terminal device to be locked by the lock program when the terminal device is determined to be in a state of the preset condition for terminal protection; and
   an information deleting unit configured to delete an unlock key for use in unlocking the locked terminal device from the memory unit after the terminal device is locked,
   wherein the preset condition for terminal protection includes at least one of;
      a case where the terminal device receives a lock command from a terminal management server remotely managing the terminal device,
      subscriber identity module (SIM) separation away from the terminal device,
      SIM replacement which is occurred in the terminal device, and
      a country code change or a firmware update which is occurred in the terminal device,
   wherein the memory unit includes data storage areas, the data storage including a non-volatile storage area, a non-user area and a user area, and wherein the unlock key is stored in the non-volatile storage area which is not reset in case of initialization, among the data storage areas of the memory unit and the unlock key is erasable from the terminal device.

2. The terminal device of claim 1,
wherein the lock program is stored in the non-user area among the data storage areas and is configured
to compare an authentication unlock key created by using an entered password and identification information of the terminal device with the unlock key stored in the non-volatile storage area to perform authentication, and
to lock the terminal device depending on a result of the authentication or decision on whether the condition for terminal protection is satisfied, and
wherein a terminal management application program is stored in the user area among the data storage areas and is configured
to access a terminal management server remotely managing the terminal device in accordance with an instruction from the terminal management server, and
to lock the terminal device when a lock command is received from the terminal management server.

3. The terminal device of claim 2,
wherein when booting the terminal device starts, the lock program is driven to detect whether the terminal management application program exists in the user area, and
wherein the terminal device is locked when the terminal management application program is not found in the user area.

4. The terminal device of claim 2,
wherein the non-volatile storage area stores a public key for use in creating a key signature value and the key signature value,
wherein a root file system area in the non-user area stores a lock checking program configured to verify the public key with the public key whether the key signature value is a normal value while performing functions of the lock program, and
wherein a secure boot area of the non-user area stores a lock monitoring program to be driven, when the booting the terminal device starts, to detect whether the lock checking program exists in the root file system area and the terminal device is locked when the lock checking program is not found in the root file system area.

5. A method for protecting a terminal device comprising one or more processors and/or application-specific integrated circuits (ASICs), the method executed by the one or more processors and/or the ASICs, the method comprising:
determining whether the terminal device is in a state of a preset condition for terminal protection;
locking the terminal device when the terminal device is determined to be in a state of the preset condition for terminal protection; and
deleting an unlock key for use in unlocking the terminal device, from the terminal device after locking the terminal device,
wherein the preset condition for terminal protection includes at least one of;
a case where the terminal device receives a lock command from a terminal management server remotely managing the terminal device,
subscriber identity module (SIM) separation away from the terminal device,
SIM replacement which is occurred in the terminal device, and
a country code change or a firmware update which is occurred in the terminal device,
wherein the unlock key is stored in a non-volatile storage area which is not reset in case of initialization, among data storage areas of the terminal device and the unlock key is erasable from the terminal device.

6. The method of claim 5,
wherein a lock program is stored in a non-user area among the data storage areas and is configured
to compare an authentication unlock key for created by using an entered password and the identification information of the terminal device with the unlock key stored in the non-volatile storage area to perform authentication, and
to lock the terminal device depending on a result of the authentication or decision about whether the condition for terminal protection is satisfied, and
wherein a terminal management application program is stored in a user area among the data storage areas and is configured
to access a terminal management server remotely managing the terminal device in accordance with an instruction from the terminal management server, and
to lock the terminal device when a lock command is received from the terminal management server.

7. The method of claim 6, further comprising:
driving the lock program, when booting the terminal device starts, to detect whether the terminal management application program is found in the user area; and
locking the terminal device when the terminal management application program is not found in the user area.

8. The method of claim 7,
wherein the non-volatile storage area stores a public key for use in creating a key signature value, and the key signature value,
wherein a root file system area in the non-user area stores a lock checking program configured to verify with the public key to whether the key signature value is a normal value while performing functions of the lock program and
wherein a secure boot area of the non-user area stores a lock monitoring program to be driven, when the booting the terminal device starts, to detect whether the lock checking program exists in the root file system area, and the terminal device is locked if the lock checking program is not found in the root file system area.

9. A non-transitory computer-readable storage medium having a program stored therein to perform the method for protecting a terminal device comprising one or more processors and/or application-specific integrated circuits (ASICs), the method comprising:
determining whether the terminal device is in a state of a preset condition for terminal protection;
locking the terminal device when the terminal device is determined to be in a state of the preset condition for terminal protection; and
deleting an unlock key for use in unlocking the terminal device, from the terminal device after locking the terminal device,
wherein the preset condition for terminal protection includes at least one of;
a case where the terminal device receives a lock command from a terminal management server remotely managing the terminal device, subscriber identity module (SIM) separation away from the terminal device, SIM replacement which is occurred in the terminal device, and a country code change or a firmware update which is occurred in the terminal device, and wherein the unlock key is stored in a non-volatile storage area which is not reset in case of initialization, among data storage areas of the terminal device and the unlock key is erasable from the terminal device.

* * * * *